(12) United States Patent
Handshaw et al.

(10) Patent No.: US 12,067,452 B2
(45) Date of Patent: Aug. 20, 2024

(54) METHODS AND APPARATUS FOR USING AN INDICATOR WINDOW OF A HANDHELD SCANNER AS A TRIGGER

(71) Applicant: ZEBRA TECHNOLOGIES CORPORATION, Lincolnshire, IL (US)

(72) Inventors: Darran Michael Handshaw, Sound Beach, NY (US); Ronald Steven Ethe, Commack, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/504,746

(22) Filed: Oct. 19, 2021

(65) Prior Publication Data

US 2023/0124084 A1    Apr. 20, 2023

(51) Int. Cl.
*G06K 9/22*    (2006.01)
*G01J 1/02*    (2006.01)
*G01J 1/04*    (2006.01)
*G01J 1/42*    (2006.01)
(Continued)

(52) U.S. Cl.
CPC .......... *G06K 7/1413* (2013.01); *G01J 1/0233* (2013.01); *G01J 1/0271* (2013.01); *G01J 1/0407* (2013.01); *G01J 1/4204* (2013.01); *G06K 7/10881* (2013.01); *G06K 2007/10524* (2013.01)

(58) Field of Classification Search
CPC .......... G06K 7/10732; G06K 7/10722; G06K 7/10881; G06K 7/10623; G06K 2207/1012; G06K 7/10564; G06K 2207/1011; G06K 7/1413; G06Q 20/20; G06Q 30/0267; G06Q 30/00; G06Q 30/0641; G06F 3/014; G06F 16/9554; G06F 3/0321

USPC ............. 235/462.48, 462.45, 462.46, 472.01
See application file for complete search history.

(56) References Cited

U.S. PATENT DOCUMENTS

| 5,410,141 A | 4/1995 | Koenck et al. |
| 5,637,851 A * | 6/1997 | Swartz ............... G06K 7/10881 235/470 |
| 7,604,175 B2 | 10/2009 | Zhu et al. |

(Continued)

OTHER PUBLICATIONS

International Search Report and Written Opinion for International Application No. PCT/US2022/44996 mailed on Dec. 30, 2022.

*Primary Examiner* — Daniel St Cyr (57) ABSTRACT

Methods and apparatus for using an indicator window of a handheld scanner as a trigger are disclosed herein. An example handheld scanner includes: a housing; an image sensor to capture image data through a front-facing opening; an indicia decoder; an indicator window positioned to face generally away from the front-facing opening and toward a user when the handheld scanner is in a handheld position; a light source disposed inside the housing to emit indication light through the window to provide an indication; a light detector disposed inside the housing and positioned to detect a reflection of the indication light received from an object positioned in front of or on the window outside the housing; and a processor configured to control a mode of the handheld scanner and/or a device in communication with the handheld scanner in response to the light detector detecting the reflection of the emitted indication light.

23 Claims, 7 Drawing Sheets

(51) Int. Cl.
    *G06K 7/10*           (2006.01)
    *G06K 7/14*           (2006.01)

(56) References Cited

U.S. PATENT DOCUMENTS

| | | | |
|---|---|---|---|
| 9,117,129 B1* | 8/2015 | Koch | H01H 9/06 |
| 2005/0077359 A1* | 4/2005 | Boehm | G06K 7/10544 |
| | | | 235/454 |
| 2005/0103868 A1* | 5/2005 | Zhu | G06K 7/10732 |
| | | | 235/462.46 |
| 2009/0001171 A1 | 1/2009 | Carlson et al. | |
| 2010/0019882 A1* | 1/2010 | Stern | G06K 7/0008 |
| | | | 340/10.1 |
| 2011/0114728 A1* | 5/2011 | Chernyakov | G06K 7/10564 |
| | | | 235/454 |
| 2012/0199655 A1 | 8/2012 | Fukuba | |
| 2014/0048684 A1 | 2/2014 | Barkan et al. | |
| 2015/0069130 A1* | 3/2015 | Gannon | H01M 50/00 |
| | | | 235/472.01 |
| 2017/0206389 A1* | 7/2017 | Gannon | G06K 7/1413 |
| 2019/0130150 A1* | 5/2019 | Handshaw | G06K 7/109 |
| 2019/0362117 A1 | 11/2019 | Handshaw et al. | |

\* cited by examiner

METHODS AND APPARATUS FOR USING AN INDICATOR WINDOW OF A HANDHELD SCANNER AS A TRIGGER

BACKGROUND

Manufacturers of handheld scanners often find that users desire the ability to quickly change a mode of a handheld scanner. For instance, to control how barcodes are parsed and processed (e.g., to handle the barcode on a hospital identification band differently from the barcode on a medical supply). However, having to control the mode via a host system associated with a handheld scanner can be cumbersome and slow. Moreover, adding a mechanical button to a handheld scanner for quickly controlling a mode of the handheld scanner may be complicated and difficult, entailing design work that may be complicated by sealing and/or electro-static discharge requirements.

Accordingly, there is a need for methods and apparatus for providing control inputs to a handheld scanner without requiring a mechanical button or relying on a host system.

SUMMARY

In an embodiment, a handheld scanner comprises a housing, an image sensor, an indicia decoder, an indicator window, a light source, a light detector, and a processor. The housing has a front-facing opening on a front side, wherein the front-facing opening is configured to face away from a user when the user has the handheld scanner in a handheld position. The image sensor is directed toward the opening, and configured to capture image data representing a target in a field of view of the handheld scanner that passes through the front-facing opening. The indicia decoder is in communication with the image sensor, and configured to receive the image data and decode an indicia captured in the image data. The indicator window is defined in the housing and positioned to face at least one of rearwardly, upwardly, or sidewardly relative to the front-facing opening and toward a user to be generally visible to the user when the user has the handheld scanner in the handheld position. The light source is disposed inside the housing and positioned to emit indication light through the indicator window to provide an indication. The light detector is disposed inside the housing and positioned to detect a reflection of the emitted indication light received from an object positioned in front of or on the indicator window, wherein the reflection of the emitted indication light occurs when the object is positioned in front of or on the indicator window outside the housing. The processor is configured to control a mode of the handheld scanner and/or a device in communication with the handheld scanner in response to the light detector detecting the reflection of the emitted indication light.

In a variation of this embodiment, the light detector is configured to detect an amount of ambient light when the indication light is not being emitted, and the processor is further configured to control the mode in response to the light detector detecting a change in the amount of ambient light.

In a variation of this embodiment, the processor is further configured to control the mode when an amount of reflected indication light satisfies a criteria.

In a variation, the criteria is user configurable.

In a variation of this embodiment, the handheld scanner further comprises a second indicator window, a second light source, and second light detector. The second indicator window is defined in the housing and positioned to face at least one of rearwardly, upwardly, or sidewardly relative to the front-facing opening and toward a user to be generally visible to the user when the user has the handheld scanner in a handheld position. The second light source is disposed inside the housing and positioned to emit second indication light through the second indicator window to provide a second indication. The second light detector is disposed inside the housing and positioned to detect a reflection of the emitted second indication light, wherein the reflection of the emitted second indication light occurs when an object is positioned in front of or on the second indicator window outside the housing. The processor is further configured to control a second mode of the handheld scanner and/or the device in response to the second light detector detecting the reflection of the emitted second indication light.

In a variation of this embodiment, the processor is further configured to control the light source to provide the indication light as a steady light to indicate a powered on status and to provide the indication light in a blinking manner to indicate a successful indicia decode.

In a variation of this embodiment, the mode includes at least one of a barcode parsing mode, a barcode data format mode, an indicia parsing mode, an indicia data format mode, a user interface mode, a user interface parameter, a sound volume, a vibration setting, a display color, an aiming mode, an illumination mode, an image sensor mode, or a wireless mode.

In a variation of this embodiment, the indicator window is positioned such that the user may ergonomically position a finger or thumb of their hand in front of or on the indicator window while gripping the handheld scanner to cause the reflection of the emitted indication light.

In a variation of this embodiment, the light source is configured to emit the indication light at a wavelength, the light detector includes a filter configured to substantially allow light having the wavelength to pass through the filter, and to reduce the amount of light having other wavelengths passing through the filter, and a photodetector configured to detect an amount of light passing through the filter, and the processor is further configured to control the mode when the detected amount of light passing through the filter satisfies a criteria.

In a variation of this embodiment, the handheld scanner further comprises an output device configured to provide a confirmation of the control of the mode.

In a variation, the output device includes at least one of a sound generation device, a haptic device, an aiming pattern generator, an illumination generator, or the light source.

In a variation of this embodiment, the processor is further configured to at least one of (1) control the mode while the reflection of the emitted indication light is detected, (2) control the mode by switching the mode through a plurality of modes each time the reflection of the emitted indication light is detected, or (3) control the mode by toggling the mode between two modes each time the reflection of the emitted indication light is detected.

In another embodiment, a method for controlling a mode of a handheld scanner, the handheld scanner having a housing, a front-facing opening on a front side of the housing, wherein the front-facing opening is configured to face away from a user when the user has the handheld scanner in a handheld position, an image sensor directed toward the front-facing opening and configured to capture image data representing a target in a field of view of the handheld scanner that passes through the front-facing opening, an indicia decoder in communication with the image sensor and configured to receive the image data and decode an indicia captured in the image data, and a indicator window defined in the housing and positioned to face at least one of rearwardly, upwardly, or sidewardly relative to the front-facing opening and toward the user to be generally visible to the user when the user has the handheld scanner in the handheld position. The method comprises: generating light with a light source disposed inside the housing; providing an indication to the user by emitting the light through the indicator window; detecting a reflection of the emitted light with a light detector disposed inside the housing, wherein the reflection of the emitted light occurs when an object is positioned in front of or on the indicator window outside the housing; and controlling the mode of the handheld scanner and/or a device in communication with the handheld scanner in response to detecting the reflection of the emitted light.

In a variation of this embodiment, the method further comprises: detecting an amount of ambient light when the indication light is not being emitted; and controlling the mode in response to detecting a change in the amount of ambient light.

In a variation of this embodiment, the mode is controlled when an amount of reflected indication light satisfies a criteria.

In a variation of this embodiment, the method further comprises controlling the light source to provide the indication light as a steady light to indicate a powered on status and to provide the indication light in a blinking manner to indicate a successful indicia decode.

In a variation of this embodiment, the indication light is light of a wavelength, and the method further comprises filtering the reflected emitted light to substantially allow light having the wavelength to pass, and to reduce the amount of light having other wavelengths passing through the filter, and a photodetector configured to detect an amount of light passing through the filter. Controlling the mode in response to detecting the reflection of the emitted light includes controlling the mode when an amount of the filtered reflected emitted light satisfies a criteria.

In a variation of this embodiment, controlling the mode includes at least one of (1) control the mode while the reflection of the emitted indication light is detected, (2) control the mode by switching the mode through a plurality of modes each time the reflection of the emitted indication light is detected, or (3) control the mode by toggling the mode between two modes each time the reflection of the emitted indication light is detected.

In yet another embodiment, a non-transitory, computer-readable, storage medium stores computer-readable instructions that, when executed by one or more processors, cause a handheld scanner to: capture image data representing a target in a field of view of the handheld scanner that passes through a front-facing opening on a front side of the handheld scanner, wherein the front-facing opening is configured to face away from a user when the user has the handheld scanner in a handheld position; and decode an indicia captured in the image data. The instructions, when executed by the one or more processors, cause the handheld scanner to also: generate light with a light source disposed inside the handheld scanner; provide an indication to the user by emitting the light through an indicator window of the handheld scanner, wherein the indicator window is positioned to face at least one of rearwardly, upwardly, or sidewardly relative to the front-facing opening and toward the user to be generally visible to the user when the user has the handheld scanner in the handheld position; detect a reflection of the emitted light with a light detector disposed inside the handheld scanner, wherein the reflection of the emitted light occurs when an object is positioned in front of or on the indicator window outside the handheld scanner; and control a mode of the handheld scanner and/or a device in communication with the handheld scanner in response to detecting the reflection of the emitted light.

In a variation of this embodiment, the instructions, when executed by the one or more processors, causes the handheld scanner to: detect an amount of ambient light when the indication light is not being emitted; and control the mode in response to detecting a change in the amount of ambient light.

In a variation of this embodiment, the instructions, when executed by the one or more processors, causes the handheld scanner to control the mode when an amount of reflected indication light satisfies a criteria.

In a variation of this embodiment, the instructions, when executed by the one or more processors, causes the handheld scanner to control the light source to provide the indication light as a steady light to indicate a powered on status and to provide the indication light in a blinking manner to indicate a successful indicia decode.

In a variation of this embodiment, the instructions, when executed by the one or more processors, causes the handheld scanner to control the mode by at least one of (1) control the mode while the reflection of the emitted indication light is detected, (2) control the mode by switching the mode through a plurality of modes each time the reflection of the emitted indication light is detected, or (3) control the mode by toggling the mode between two modes each time the reflection of the emitted indication light is detected.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

Figure 1:
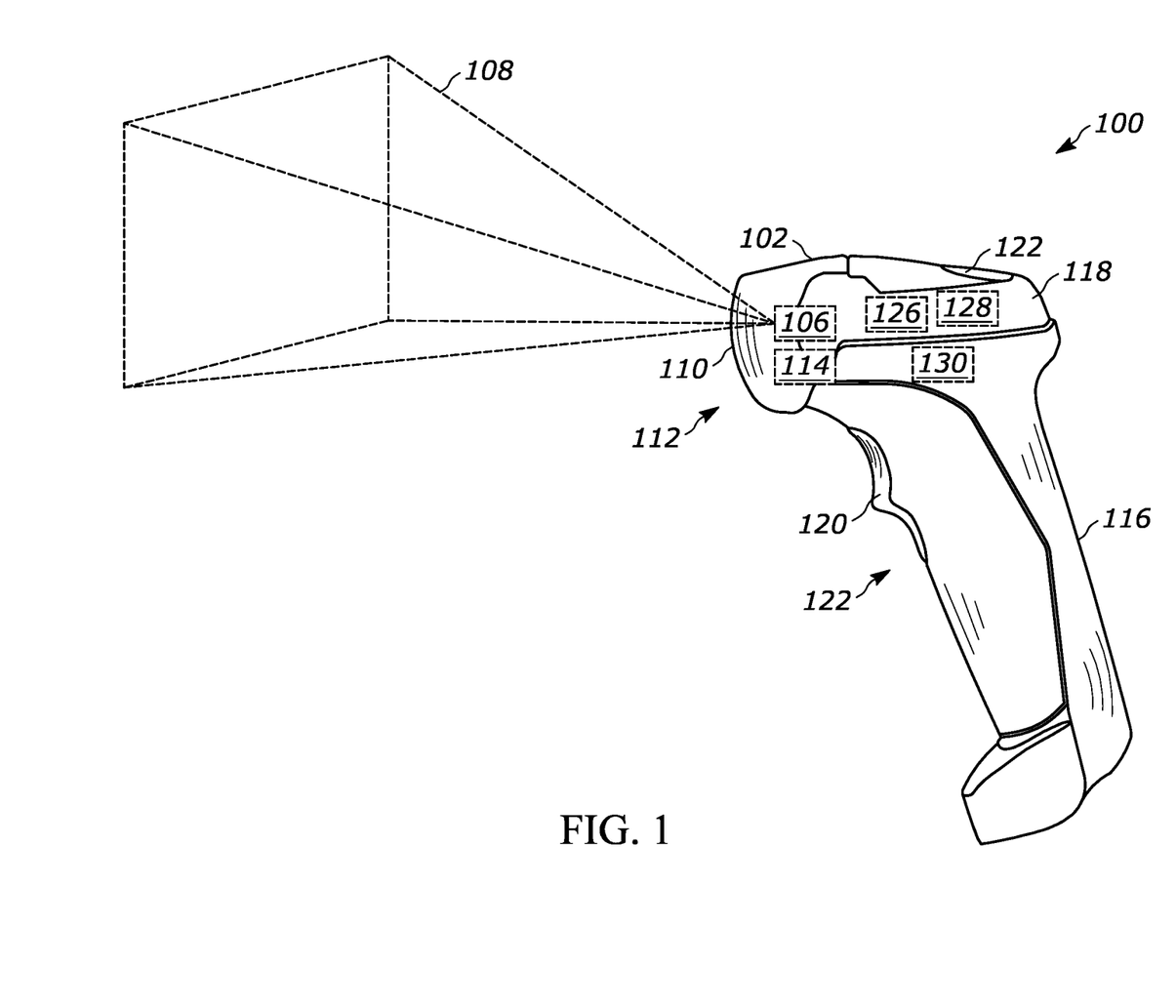
FIG. 1 is a perspective view of an example handheld scanner, in accordance with embodiments of the disclosure.
Figure 2:
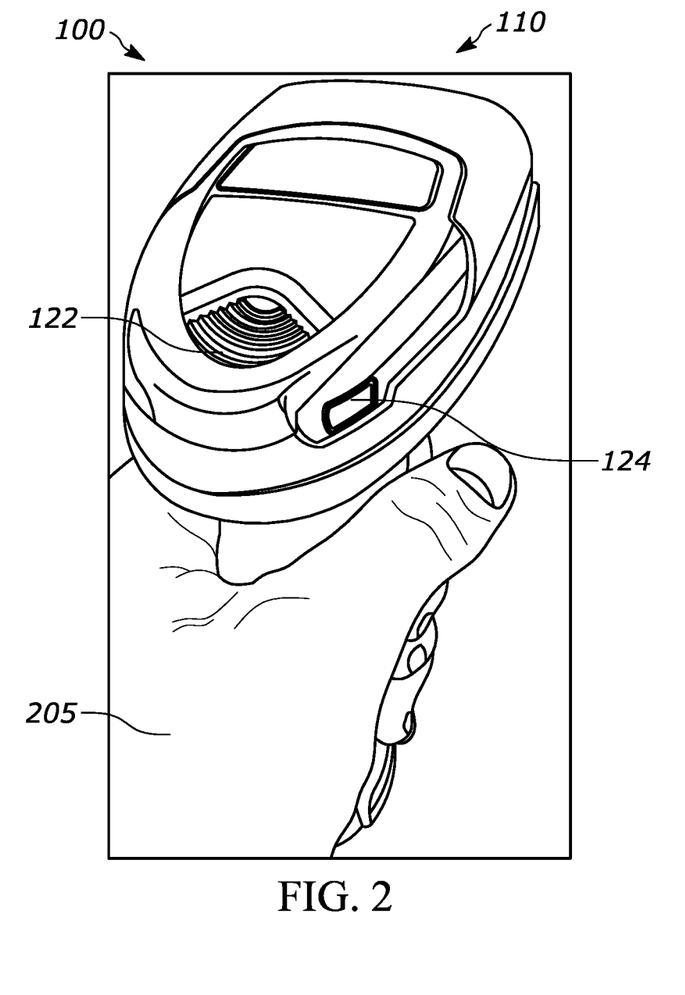
FIG. 2 is an image of an example handheld scanner being held by a hand in a handheld mode.
Figure 3A:
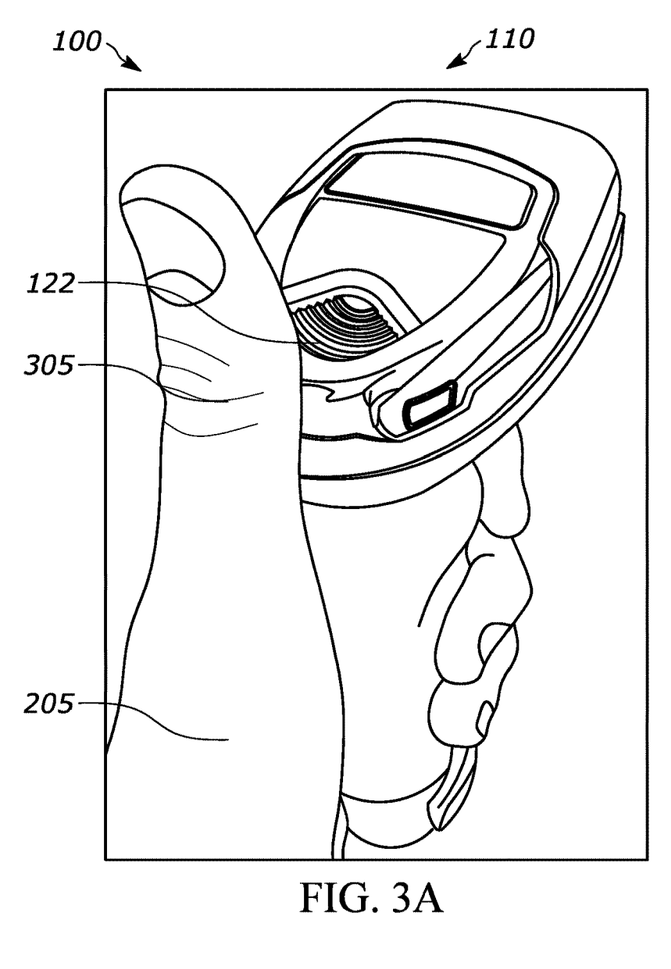
FIGS. 3A and 3B are images illustrating an example use of the handheld scanner of FIG. 2 to provide a control input.
Figure 3B:
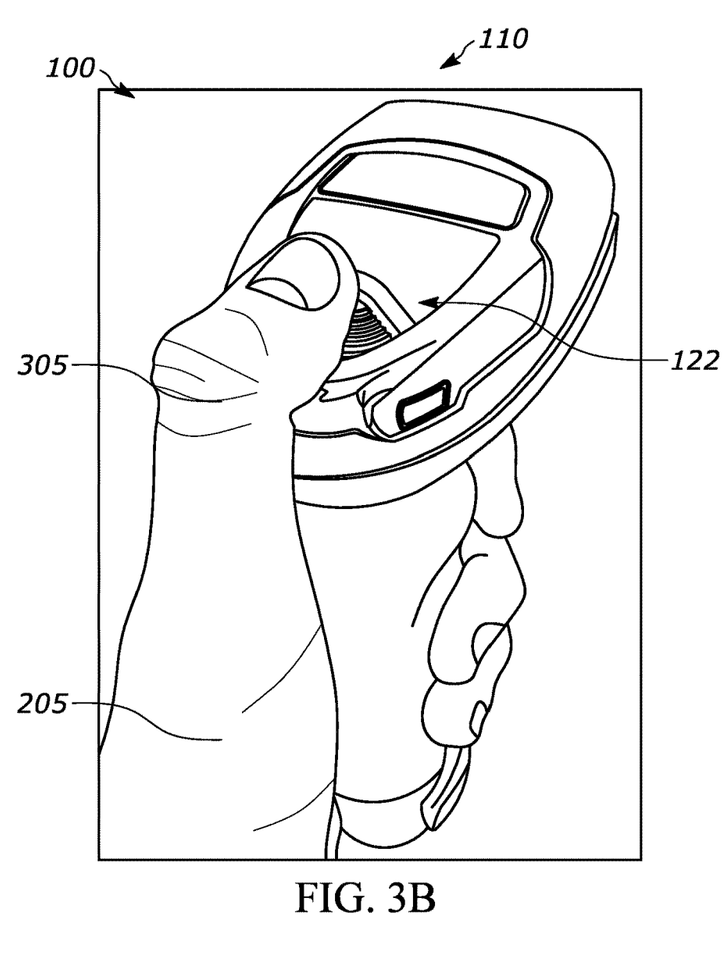
Figure 4A:
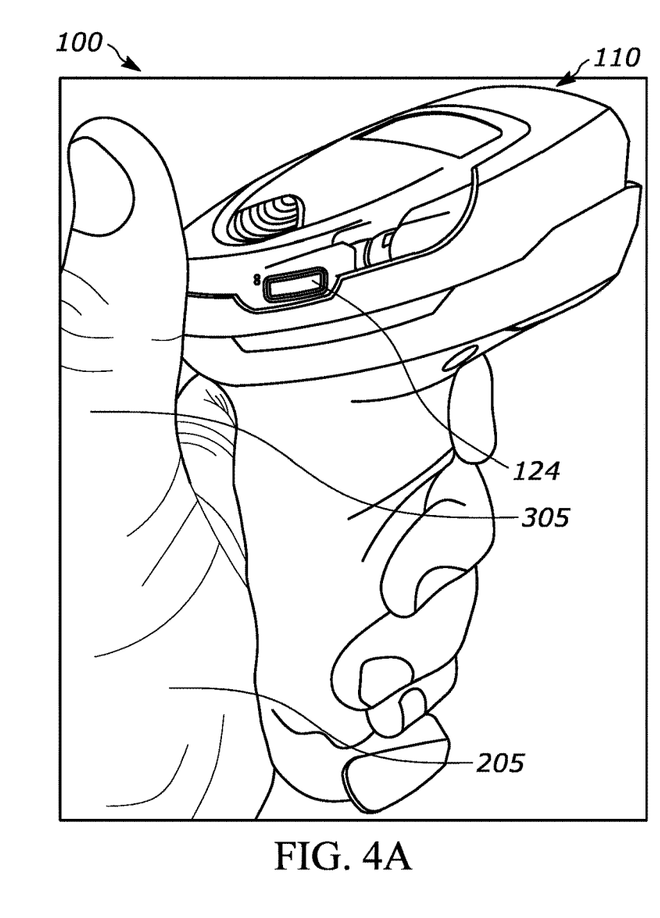
FIGS. 4A and 4B are images illustrating another example use of the handheld scanner of FIG. 2 to provide a control input.
Figure 4B:
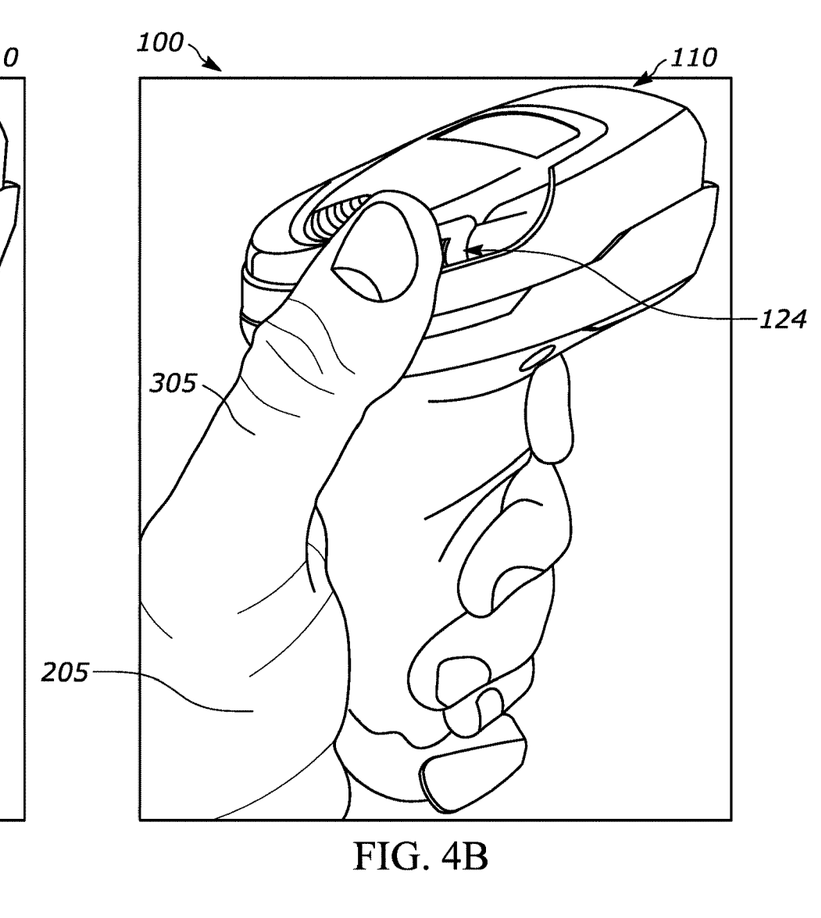

FIG. 1 illustrates an example handheld scanner 100 configured to, among possibly other things, scan and decode indicia, such as a barcode, direct product marking (DPM), or the like. FIG. 2 is an image of an example of the handheld scanner 100 being held by a hand 205 of a user in a handheld position. FIGS. 3A and 3B are images illustrating an example movement of a thumb 305 to control a mode of the handheld scanner 100, in accordance with disclosed embodiments. FIGS. 4A and 4B are images illustrating another example movement of the thumb 305 to control a mode of the handheld scanner 100, in accordance with disclosed embodiments. As will be described in detail below, the placement of the thumb 305 in front of or on, or on an indicator window outside the handheld scanner 100 can be detected and used to trigger control of a mode of the handheld scanner 100. For example, the placement of the thumb 305 in front of or on an indicator window can cause indication light emitted from the handheld scanner through the window to be reflected back through the indicator window where it can be detected by a light detector inside the handheld scanner 100. Additionally or alternatively, the placement of the thumb 305 in front of or on an indicator window can cause a change in an amount of ambient light detected through the indicator window by a light detector. Typical handheld scanners include one or more indicator windows and one or more light sources to provide indications by emitting light through the indicator window(s). Accordingly, disclosed embodiments can be advantageously implemented by simply adding (1) one or more light detectors in association with the indicator window(s) onto a circuit board alongside the light sources, and (2) logic for controlling a mode of the handheld scanner based upon outputs of the light detector(s).

The example handheld scanner 100 includes an example housing 102 in which an image sensor 106 is disposed. The image sensor 106 captures image data representing a target in a field of view 108 of the handheld scanner 100 that passes through a front-facing opening or window 110 on a front side 112 of the handheld scanner 100. The handheld scanner 100 includes an indicia decoder 114 in communication with the image sensor 106, and configured to receive the image data and decode an indicia captured in the image data.

The example housing 102 of FIG. 1 includes a generally elongated handle or lower handgrip portion 116, and an upper body portion 118 having the front side 112 at which the light-transmissive window or opening 110 is located. The cross-sectional dimensions and overall size of the handgrip portion 116 are such that the handheld scanner 100 can be conveniently held in an operator's hand (e.g., as shown in the example image of FIG. 2). As shown in FIG. 2, the front-facing opening or window 110 is configured to face generally away from a user when the user has the handheld scanner 100 in a handheld position. The portions 116 and 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner 100. Although the housing 102 is illustrated as a portable, point-of-transaction, gun-shaped, handheld housing, any other configuration including a hands-free configuration could be used.

A manually actuatable trigger 120 is mounted in a moving relationship on the handgrip portion 116 in a forward facing region 122 of the handgrip portion 116. An operator's finger can be used to actuate (e.g., depress) the trigger 120 once a target falls within the imaging field of view 108 to cause the image sensor 106 to capture an image of the target.

To provide one or more indications (e.g., steady indication light indicating the handheld scanner 100 is powered on, a blinked indication light indicating an indicia has been decoded, etc.), the handheld scanner 100 includes one or more example indicator windows 122 and 124 (e.g., see FIG. 2) defined in the housing 102. The indicator windows 122, 124 are positioned, as shown in FIG. 2, to face at least one of rearwardly, upwardly, or sidewardly relative to the front-facing window or opening 110, and towards a user such that the indicator windows 122, 124 are generally visible to the user while the user has the handheld scanner 100 in the handheld position.

To generate light to be emitted through the indicator windows 122, 124 as indication light, the handheld scanner 100 includes one or more light sources (one of which is designated at reference numeral 126) disposed inside the housing 102 and positioned to emit indication light through a respective indicator window 122, 124. The light source(s) 126 may be, or include, one or more light-emitting diodes, a light pipe, etc. To provide different indication lights through a particular window 122, 124 there may be more than one light source 126 association with that window 122, 124.

To use a reflection of indication light emitted through an indicator window 122, 124 and/or ambient light as a trigger or control input, the example handheld scanner 100 includes one or more light detectors (one of which is designated at reference numeral 128) disposed inside the housing 102 for respective ones of the indicator windows 122, 124. The light detector(s) 128 are positioned to detect a reflection of emitted indication light received from an object positioned in front of or on a respective window 122, 124 (e.g., the thumb 305 positioned in front of or on the indicator window 122 as shown in FIGS. 3A and 3B, or the thumb 305 positioned in front of or on the indicator window 124 as shown in FIGS. 4A and 4B), wherein the reflection of the emitted indication light occurs when the object (e.g., a finger or thumb) is positioned in front of or on the window 122, 124 outside the housing 102. In some examples, a light detector 128 includes a photodetector and a filter (not shown for clarity of illustration) that blocks wavelengths of light not associated with emitted indication light. For example, if emitted indication light is either green or red, then a filter could block reflected light having other colors.

As shown in FIGS. 3A, 3B, 4A and 4B, the indicator windows 122, 124 are positioned such that the thumb 305 or finger of the hand 205 holding the handheld scanner 100 can be easily, ergonomically, etc. positioned in front of or on an indicator window 122, 144 outside the housing 102 causing a reflection of emitted indication light back through the indicator window 122, 124 into the housing 102, where the reflected indication light can be detected using the light detector(s) 128. The placements of the example indicator windows 122, 124 away from where a user normally grips the handheld scanner 100 (as shown in FIG. 2) helps to ensure that indications are visible while the handheld scanner 100 is being used in the handheld position and to reduce unintended mode changes. While examples disclosed herein refer to a handheld scanner, the use of indicator windows and light detectors as disclosed herein may be used when a handheld scanner is placed in a cradle and operated in a handsfree mode, with a bioptic scanner, with a slot scanner, etc.

The example handheld scanner 100 includes a processor 130 configured to control one or more modes of the handheld scanner 100 and/or a device in communication with the handheld scanner 100 (e.g., a point-of-sale (POS) station, an inventory management system, etc.) in response to the light detector(s) 128 detecting the reflection(s) of emitted indication light. In some examples, the processor 130 controls the mode when an amount of reflected indication light or a change in an amount of reflected indication light satisfies a criteria (e.g., exceeds a threshold). The criteria (e.g., a threshold) may be user configurable. Additionally and/or alternatively, the criteria (e.g., a threshold) may be predetermined to detect when a user with gloves, dark skin, etc. is positioned in front of or on an indicator window 122, 124, and to distinguish the reflected indication light from ambient light. The controller may control the mode by (1) controlling the mode while a reflection of the emitted indication light is detected, (2) controlling the mode by switching the mode through a plurality of modes each time a reflection of the emitted indication light is detected, and/or (3) controlling the mode by toggling the mode between two modes each time a reflection of the emitted indication light is detected. Example modes of the handheld scanner 100 that may be controlled include a barcode parsing mode, a barcode data format mode, an indicia parsing mode, an indicia data format mode, a user interface mode, a user interface parameter, a sound volume, a vibration setting, a display color, an aiming mode, an illumination mode, an image sensor mode, a wireless mode, etc.

Additionally and/or alternatively, the light detector 128 can detect an amount of ambient light outside the housing 102 such that the processor 130 can control a mode of the handheld scanner 100 in response to a detected change in ambient light. For example, the processor 130 can determine that an amount of ambient light has dropped (e.g., when a user places a finger or thumb on or in front of an indicator window 122, 124). For example, the processor 130 can determine that a low amount of ambient light has been present for a period a time (e.g., the lights in a store or warehouse were turned off), and control the handheld scanner 100 into a sleep, low-power, etc. mode or state. In some examples, the processor 130 uses detected amounts of light when indication light is active and when indication light is inactive to determine an amount of light that needs to be detected to distinguish reflected indication light from ambient light to reduce unintended or false mode control changes. In some examples, ambient light detection is used to help detect fingers and/or thumbs (e.g., with dark skin tone or with a dark glove) that don't generate a high level of reflected light. Because the ambient light would still be blocked in such instances, having ambient light detection can improve the accuracy of the system to ensure those cases can change modes correctly. For instance, when the ambient light sensor detects that the ambient light level has been reduced below a certain threshold, the reflected light sensor threshold might be lowered accordingly. Two or more light detectors 128 per indication window 122, 124 may be used. For example, one tuned to emitted indication light and one tuned to ambient light could be used.

In some examples, an output device provides an output that confirms that the mode has changed. Example output devices include a sound generation device, a haptic device, an aiming pattern generator, an illumination generator, or the light source(s) 126.

Figure 5:
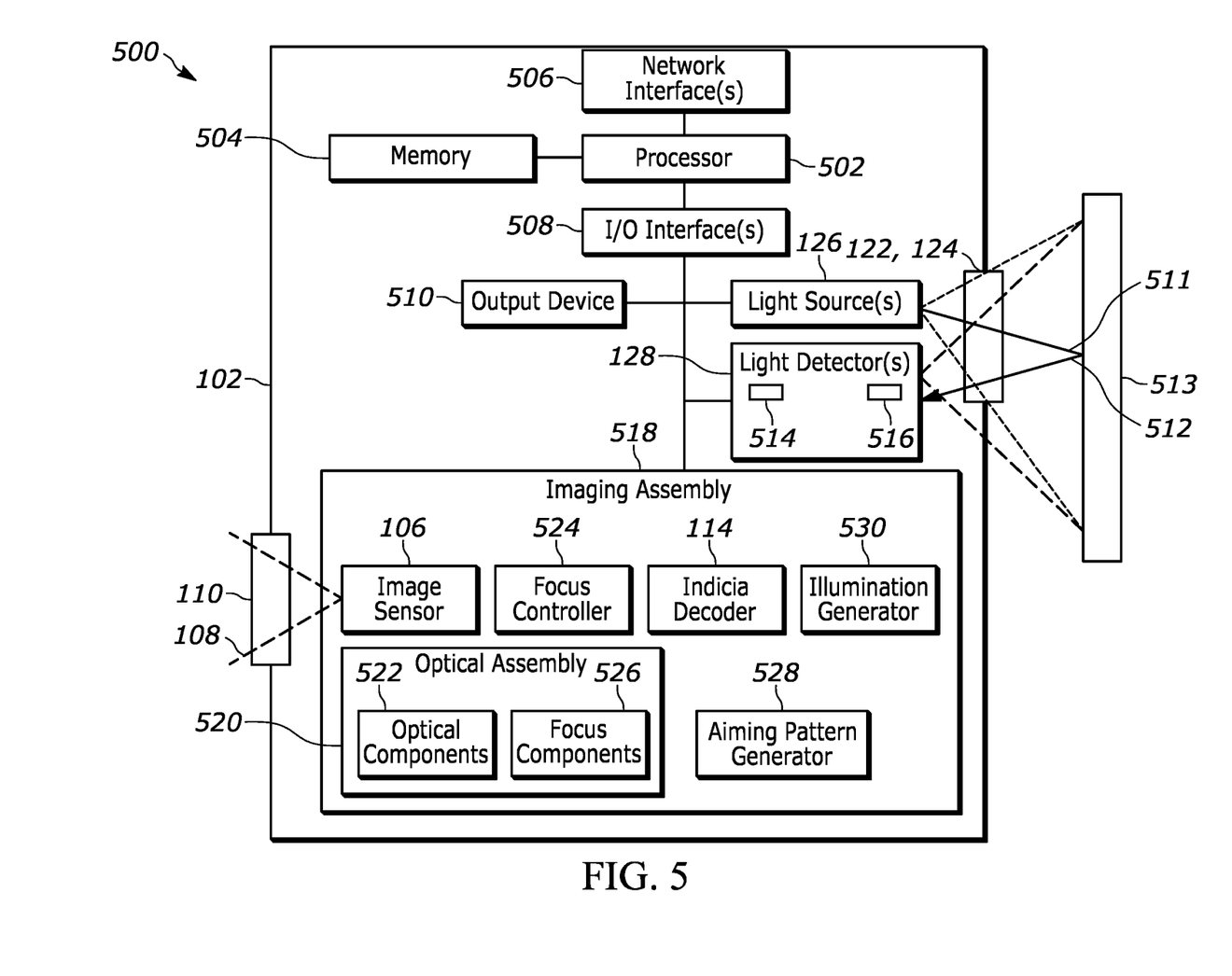
FIG. 5 is a block diagram of an example logic circuit for implementing the example handheld scanner of FIG. 1 and/or the example methods and/or operations described herein.

FIG. 5 is a block diagram representative of an example logic circuit capable of implementing, for example, one or more of the example handheld scanners 100 of FIGS. 1, 2, 3A, 3B, 4A and 4B. The example handheld scanner 500 may be configured to capture images, decode barcodes, and control one or more modes of the handheld scanner 500 based upon reflected indication light and/or ambient light according to embodiments disclosed herein.

The example logic circuit of FIG. 5 is a processing platform 500 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 500 of FIG. 5 includes a processor 502 such as, for example, one or more microprocessors, controllers, and/or any suitable type of processor that may be used to implement the example processor 130 of FIG. 1. The example processing platform 500 of FIG. 5 includes memory (e.g., volatile memory, non-volatile memory) 504 accessible by the processor 502 (e.g., via a memory controller). The example processor 502 interacts with the memory 504 to obtain, for example, machine-readable instructions stored in the memory 504 corresponding to, for example, the operations represented by the flowchart(s) of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 500 to provide access to the machine-readable instructions stored thereon. The processor 502 and the memory 504 are disposed in the housing 102.

The example processing platform 500 of FIG. 5 includes one or more communication interfaces such as, for example, one or more network interfaces 506, and/or one or more input/output (I/O) interfaces 508 disposed in the housing 102. The communication interface(s) may enable the processing platform 500 of FIG. 5 to communicate with, for example, another device, system, host system (e.g., an inventory management system, a POS station, etc.), datastore, database, and/or any other machine.

The example processing platform 500 of FIG. 5 may include the network interface(s) 506 to enable communication with other machines (e.g., an inventory management system, a POS station, etc.) via, for example, one or more networks. The example network interface(s) 506 include any suitable type of communication interface(s) (e.g., wired and/or wireless interfaces) configured to operate in accordance with any suitable communication protocol(s). Example network interfaces 506 include a TCP/IP interface, a WiFi™ transceiver (e.g., according to the IEEE 802.11x family of standards), an Ethernet transceiver, a cellular network radio, a satellite network radio, or any other suitable interface based on any other suitable communication protocols or standards.

The example, processing platform 500 of FIG. 5 may include the input/output (I/O) interface(s) 508 (e.g., a Bluetooth® interface, a near-field communication (NFC) interface, a universal serial bus (USB) interface, a serial interface, an infrared interface, etc.) to (1) enable receipt of user input (e.g., from the trigger 120 of FIG. 1, a touch screen, keyboard, mouse, touch pad, joystick, trackball, microphone, button, etc.), (2) communicate output data (e.g., mode change confirmations, visual indicators, instructions, data, images, etc.) to the user (e.g., via an output device 510, speaker, printer, haptic device, the light source(s) 126, etc.), and/or (3) interact with other components of the handheld scanner 500 (e.g., an imaging assembly 518, the output device 510, the light source(s) 126, the light detector(s) 128, etc.).

To provide one or more indications (e.g., steady indication light indicating the handheld scanner 100 is powered on, a blinked indication light indicating an indicia has been decoded, etc.), the handheld scanner 500 includes the one or more indicator windows 122 and 124 (see FIG. 2) defined in the housing 102. The indicator window 122, 124 are positioned (e.g., as shown in FIG. 2) to face at least one of rearwardly, upwardly, or sidewardly relative to the front-facing window or opening 110, and towards a user such that the indicator windows 122, 124 are generally visible to the user when the user has the handheld scanner 100 in a handheld position.

To generate light to be emitted through the indicator windows 122, 124 as indication light 511, the handheld scanner 100 includes the one or more light sources 126 disposed inside the housing 102 and positioned to emit indication light 511 through a respective indicator window 122, 124. The light sources 126 may be configured to emit light of one or more colors to provide respective ones of one or more indications. The light source(s) 126 may be, or include, one or more light-emitting diodes, a light pipe, etc. To provide different indication lights 511 through a particular window 122, 124 there may be more than one light source 126 association with that window 122, 124.

To use a reflection 512 of indication light 511 emitted through an indicator window 122, 124 and/or ambient light as a trigger or control input, the example handheld scanner 500 includes the one or more light detectors 128 disposed inside the housing 102 for respective ones of the indicator windows 122, 124. The light detector(s) 128 are positioned to detect a reflection 512 of emitted indication light 511 received from an object 513 (e.g., the thumb 305) positioned on or in front of a respective indicator window 122, 124 (e.g., a thumb 305 positioned in front of or on the indicator window 122 as shown in FIGS. 3A and 3B, or a thumb 305 positioned in front of or on the window 124 as shown in FIGS. 4A and 4B). The reflection 512 of the emitted indication light 511 occurs when the object 513 (e.g., a finger or thumb) is positioned on or in front of the window 122, 124 outside the housing 102. In some examples, a light detector 128 includes a photodetector 514 and a filter 516 that blocks wavelengths of light not associated with emitted indication light. For example, if emitted indication light is either green or red, then the filter 516 could block reflected light having other colors. Additionally and/or alternatively, the light detector(s) 128 can detect an amount of ambient light outside the housing 102. Two or more light detectors 128 per indication window 122, 124 may be used. For example, one tuned to emitted indication light and one tuned to ambient light could be used.

The processor 502 is configured to, among possibly other things, control one or more modes of the handheld scanner 500 and/or a device in communication with the handheld scanner 500 (e.g., a POS station, an inventory management system, etc.) in response to the light detector(s) 128 detecting a reflection 512 of the emitted indication light 511 and/or ambient light. In some examples, the processor 502 controls the mode when an amount of reflected indication light 512 or a change in an amount of reflected indication light 512 satisfies a criteria (e.g., exceeds a threshold). The criteria (e.g., a threshold) may be user configurable. Additionally and/or alternatively, the criteria (e.g., a threshold) may be pre-determined to detect when a user with gloves, dark skin, etc. is positioned in front of or on an indicator window 122, 124, and to distinguish the reflected indication light from ambient light. The processor 502 may control the mode by (1) controlling the mode while a reflection 512 of the emitted indication light 511 is detected, (2) controlling the mode by switching the mode through a plurality of modes each time a reflection 512 of the emitted indication light 511 is detected, and/or (3) controlling the mode by toggling the mode between two modes each time a reflection 512 of the emitted indication light 511 is detected.

Additionally and/or alternatively, the processor 502 can control a mode of the handheld scanner 500 in response to a detected change in ambient light. For example, the processor 502 can determine that an amount of ambient light has dropped (e.g., when a user places a finger or thumb on or in front of an indicator window 122, 124). For example, the processor 502 can determine that a low amount of ambient light has been present for a period a time (e.g., the lights in a store or warehouse were turned off), and control the handheld scanner 500 into a sleep, low-power, etc. mode or state. In some examples, the processor 502 uses detected amounts of light when the indication light 511 is active and when the indication light is inactive to determine an amount of light that needs to be detected to distinguish reflected indication light 512 from ambient light to reduce unintended or false mode control changes.

In some examples, the output device 510 provides an output that confirms that the mode has changed. Example output devices 510 include a sound generation device, a haptic device, an aiming pattern generator 528, an illumination generator 530, or the light source(s) 126.

To capture images of objects and/or barcodes on objects, the example processing platform 500 includes the example imaging assembly 518 disposed in the housing. The imaging assembly 518 includes the image sensor 106 under control of, for example, the processor 502 to capture image frames representative of the portion of an environment in which the handheld scanner 500 is operating that falls within the imaging field of view 108 of the imaging assembly 518. The image sensor 106 includes a plurality of photosensitive elements forming a substantially flat surface. The processor 502 may be communicatively coupled to the imaging assembly 518 via the input/output (I/O) interface(s) 508.

The example imaging assembly 518 includes any number and/or type(s) indicia decoders 114 (e.g., the barcode decoder 114) to detect and/or decode indicia to determine the payload of the indicia. In some examples, the indicia decoder 114 is implemented by the processor 502. The indicia decoder 114, e.g., via the processor 502, conveys the payload of decoded indicia to a host system via a communication interface such as the network interface(s) 506 and/or the I/O interface(s) 508.

The example imaging assembly 518 includes an optical assembly 520 to form images of objects in the field of view 108 on the surface of the image sensor 106. The optical assembly 520 may include any number and/or type(s) of optical elements and/or components 522 including, for example, one or more lenses, filters, focus motors, apertures, lens holder, liquid lenses, or any other components and/or optical elements.

To focus the imaging assembly 518 on an object, the example imaging assembly 518 may include a focus controller 524, and the optical assembly 520 may include any number and/or type(s) of focus components 526 (e.g., motors, liquid lenses, etc.). In some examples, the focus controller 524 is implemented by the processor 502. In some examples, the handheld scanner 500 is a fixed-focus scanner.

To generate illuminated aiming patterns, the example handheld scanner 500 may include the example aiming pattern generator 528. An example aiming pattern generator 528 may include one or more light sources (e.g., lasers, LEDs, etc.) and one or more elements (e.g., one or more apertures, one or more diffractive and/or refractive elements, etc.). The light source(s) of the aiming pattern generator 528 generate light that is passed through the element(s) to provide a clear illuminated aiming pattern in the field of view 108.

To illuminate a target to be imaged, the example handheld scanner 500 may include the illumination generator 530. The illumination generator 530 may emit light in the field of view 108 to, for example, facilitate autofocusing and/or improve the quality of image frames captured by the image sensor 106.

Figure 6:
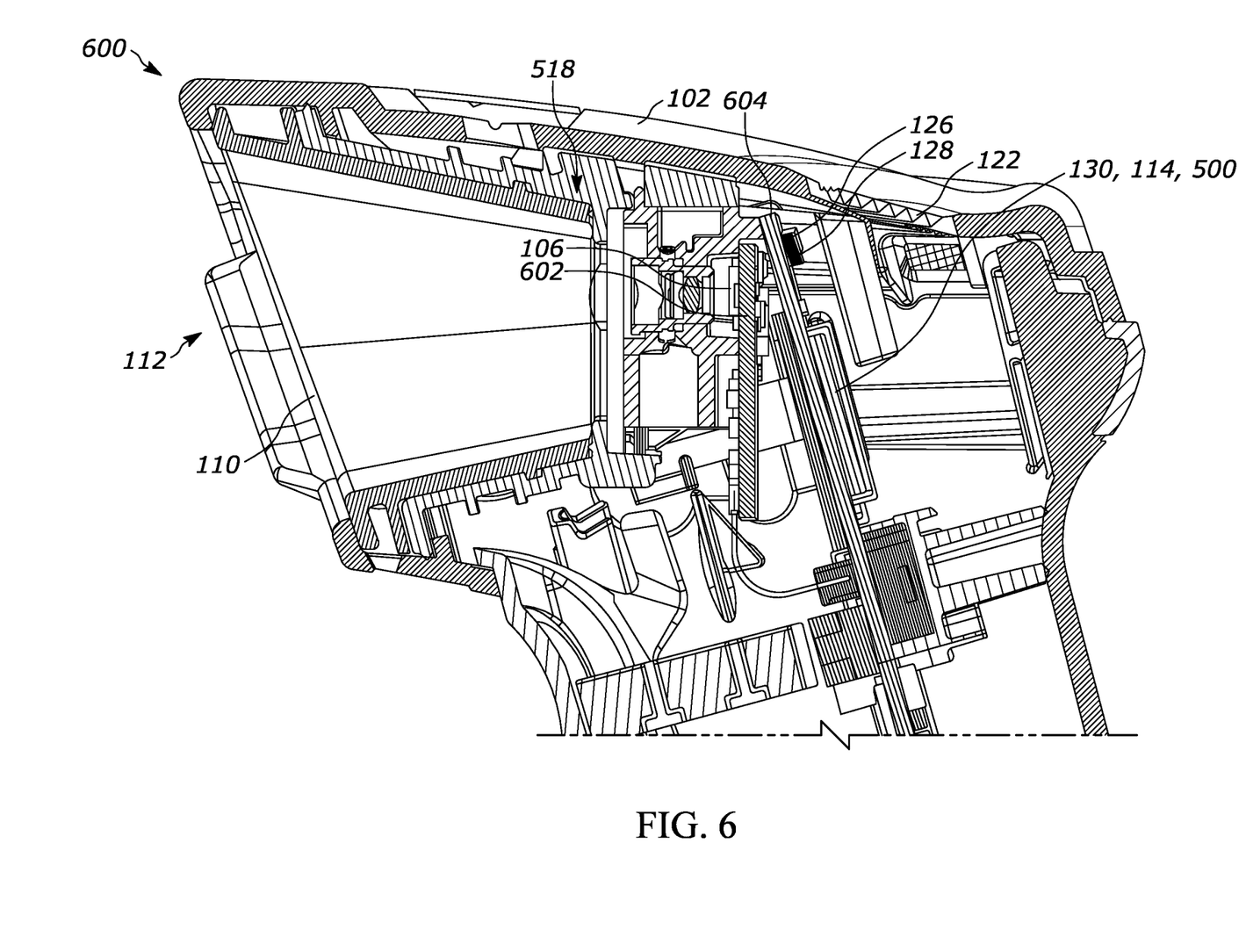
FIG. 6 is a partial side, cross-section view of the example handheld scanner of FIG. 2.

FIG. 6 is a partial side, cross-section view of an example handheld scanner 600 that may be used to implement the example handheld scanners of FIGS. 1, 2, 3A, 3B, 4A, 4B and/or 5. The example handheld scanner 600 includes the imaging assembly 518 including the image sensor 106 mounted on a first circuit board 602 and configured to capture image data representing a target in a field of view of the handheld scanner 600 that passes through a front-facing opening or window 110 on a front side 112 of the handheld scanner 600. In the illustrated example, the circuit board 602 is coupled to another circuit board 604 on which the processor 130 (which may implement the indicia decoder 114), the light source(s) 126 and the light detector(s) 128 are mounted. The light source(s) 126 emit indication light through the indicator window 122, and the light detector(s) 128 detected reflected indication light and/or ambient light through the indicator window 122. The indicator windows 122 is positioned to face at least one of rearwardly, upwardly, or sidewardly relative to the front-facing window or opening 110, and towards a user such that the indicator windows 122 is generally visible to the user when the user has the handheld scanner 600 in the handheld position (e.g., as shown in FIG. 2).

Figure 7:
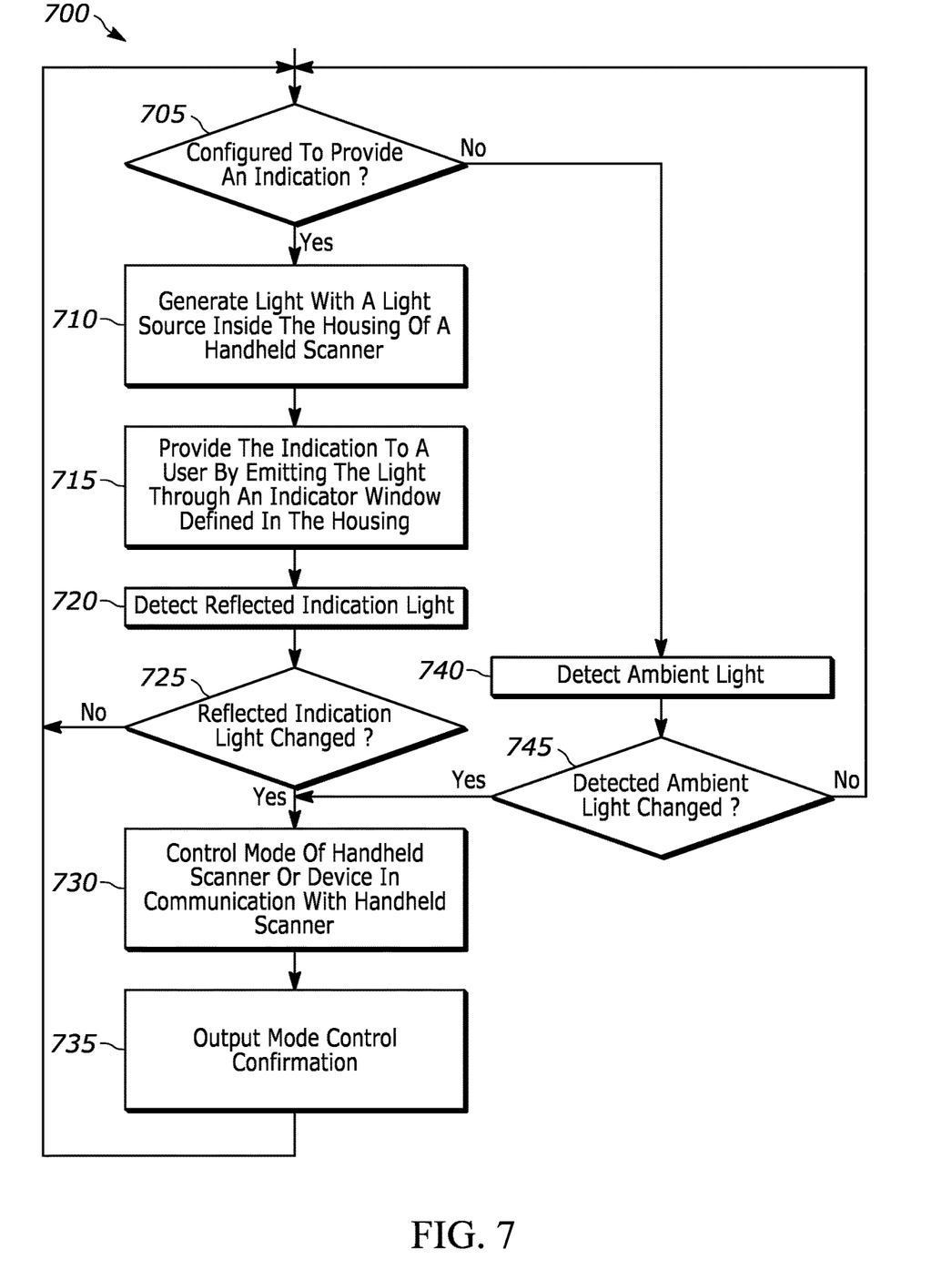
FIG. 7 is a flowchart representative of an example method, hardware logic, machine-readable instructions, or software for using an indicator window of a handheld scanner as a trigger, in accordance with embodiments of the disclosure.

FIG. 7 is a flowchart 700 representative of an example method, hardware logic, machine-readable instructions, or software for controlling a mode of a handheld scanner in response to reflected indication light and/or ambient light, as disclosed herein. Any or all of the blocks of FIG. 7 may be an executable program or portion(s) of an executable program embodied in software and/or machine-readable instructions stored on a non-transitory, machine-readable storage medium for execution by one or more processors such as the processor 502 of FIG. 5. Additionally and/or alternatively, any or all of the blocks of FIG. 7 may be implemented by one or more hardware circuits structured to perform the corresponding operation(s) without executing software or instructions.

The example flowchart 700 of FIG. 7 begins with determining whether an indication is to be provided (block 705). If an indication is to be provided, a processor (e.g., one of the example processors 130, 502) controls a light source (e.g., one of the example light sources 126) to generate light (block 710) that passes through an indicator window (e.g., one of the example indicator windows 122, 124) as indication light to provide the indication (block 715).

A light detector (e.g., one of the example light detectors 128) detects an amount of light passing through the window (block 720). If the detected amount and/or type of light is indicative of reflected indication light (block 725), the processor controls a mode of the handheld scanner (block 730), and causes an output device to provide an output as confirmation of the mode change (block 735). Control then returns to block 705 to determine whether an indication is still to be provided.

Returning to block 705, if an indication is not to be provided (block 705), a light detector (e.g., one of the example light detectors 128) detects an amount of light passing through the window (block 740). If the detected amount and/or type of light is indicative of a change in ambient light (block 745), control proceeds to block 730 where the processor controls a mode of the handheld scanner (block 730), and causes an output device to provide an output as confirmation of the mode change (block 735).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A handheld scanner comprising:
a housing having a front-facing opening on a front side, wherein the front-facing opening is configured to face away from a user when the user has the handheld scanner in a handheld position;
an image sensor directed toward the opening, and configured to capture image data representing a target in a field of view of the handheld scanner that passes through the front-facing opening;

an indicia decoder in communication with the image sensor, and configured to receive the image data and decode an indicia captured in the image data;

an indicator window defined in the housing and positioned to face at least one of rearwardly, upwardly, or sidewardly relative to the front-facing opening and toward a user to be generally visible to the user when the user has the handheld scanner in the handheld position;

a light source disposed inside the housing and positioned to emit indication light through the indicator window to provide an indication;

a light detector disposed inside the housing and positioned to detect a reflection of the emitted indication light received from an object positioned in front of or on the indicator window, wherein the reflection of the emitted indication light occurs when the object is positioned in front of or on the indicator window outside the housing; and a processor configured to control a mode of the handheld scanner and/or a device in communication with the handheld scanner in response to the light detector detecting the reflection of the emitted indication light.

2. The handheld scanner of claim 1, wherein the light detector is configured to detect an amount of ambient light when the indication light is not being emitted, and wherein the processor is further configured to control the mode in response to the light detector detecting a change in the amount of ambient light.

3. The handheld scanner of claim 1, wherein the processor is further configured to control the mode when an amount of reflected indication light satisfies a criteria.

4. The handheld scanner of claim 3, wherein the criteria is user configurable.

5. The handheld scanner of claim 1, further comprising:

a second indicator window defined in the housing and positioned to face at least one of rearwardly, upwardly, or sidewardly relative to the front-facing opening and toward a user to be generally visible to the user when the user has the handheld scanner in a handheld position;

a second light source disposed inside the housing and positioned to emit second indication light through the second indicator window to provide a second indication; and a second light detector disposed inside the housing and positioned to detect a reflection of the emitted second indication light, wherein the reflection of the emitted second indication light occurs when an object is positioned in front of or on the second indicator window outside the housing, wherein the processor is further configured to control a second mode of the handheld scanner and/or the device in response to the second light detector detecting the reflection of the emitted second indication light.

6. The handheld scanner of claim 1, wherein the processor is further configured to control the light source to provide the indication light as a steady light to indicate a powered on status and to provide the indication light in a blinking manner to indicate a successful indicia decode.

7. The handheld scanner of claim 1, wherein the mode includes at least one of a barcode parsing mode, a barcode data format mode, an indicia parsing mode, an indicia data format mode, a user interface mode, a user interface parameter, a sound volume, a vibration setting, a display color, an aiming mode, an illumination mode, an image sensor mode, or a wireless mode.

8. The handheld scanner of claim 1, wherein the indicator window is positioned such that the user may ergonomically position a finger or thumb of their hand in front of or on the indicator window while gripping the handheld scanner to cause the reflection of the emitted indication light.

9. The handheld scanner of claim 1, wherein:

the light source is configured to emit the indication light at a wavelength;

the light detector includes a filter configured to substantially allow light having the wavelength to pass through the filter, and to reduce the amount of light having other wavelengths passing through the filter, and a photodetector configured to detect an amount of light passing through the filter; and the processor is further configured to control the mode when the detected amount of light passing through the filter satisfies a criteria.

10. The handheld scanner of claim 1, further comprising an output device configured to provide a confirmation of the control of the mode.

11. The handheld scanner of claim 10, wherein the output device includes at least one of a sound generation device, a haptic device, an aiming pattern generator, an illumination generator, or the light source.

12. The handheld scanner of claim 1, wherein the processor is further configured to at least one of (1) control the mode while the reflection of the emitted indication light is detected, (2) control the mode by switching the mode through a plurality of modes each time the reflection of the emitted indication light is detected, or (3) control the mode by toggling the mode between two modes each time the reflection of the emitted indication light is detected.

13. A method for controlling a mode of a handheld scanner, the handheld scanner having a housing, a front-facing opening on a front side of the housing, wherein the front-facing opening is configured to face away from a user when the user has the handheld scanner in a handheld position, an image sensor directed toward the front-facing opening and configured to capture image data representing a target in a field of view of the handheld scanner that passes through the front-facing opening, an indicia decoder in communication with the image sensor and configured to receive the image data and decode an indicia captured in the image data, and a indicator window defined in the housing and positioned to face at least one of rearwardly, upwardly, or sidewardly relative to the front-facing opening and toward the user to be generally visible to the user when the user has the handheld scanner in the handheld position, the method comprising:

generating light with a light source disposed inside the housing;

providing an indication to the user by emitting the light through the indicator window;

detecting a reflection of the emitted light with a light detector disposed inside the housing, wherein the reflection of the emitted light occurs when an object is positioned in front of or on the indicator window outside the housing; and controlling the mode of the handheld scanner and/or a device in communication with the handheld scanner in response to detecting the reflection of the emitted light.

14. The method of claim 13, further comprising:

detecting an amount of ambient light when the indication light is not being emitted; and controlling the mode in response to detecting a change in the amount of ambient light.

15. The method of claim 13, wherein the mode is controlled when an amount of reflected indication light satisfies a criteria.

16. The method of claim 13, further comprising controlling the light source to provide the indication light as a steady light to indicate a powered on status and to provide the indication light in a blinking manner to indicate a successful indicia decode.

17. The method of claim 13, wherein the indication light is light of a wavelength, the method further comprising filtering the reflected emitted light to substantially allow light having the wavelength to pass, and to reduce the amount of light having other wavelengths passing through the filter, and a photodetector configured to detect an amount of light passing through the filter, wherein controlling the mode in response to detecting the reflection of the emitted light includes controlling the mode when an amount of the filtered reflected emitted light satisfies a criteria.

18. The method of claim 13, wherein controlling the mode includes at least one of (1) control the mode while the reflection of the emitted indication light is detected, (2) control the mode by switching the mode through a plurality of modes each time the reflection of the emitted indication light is detected, or (3) control the mode by toggling the mode between two modes each time the reflection of the emitted indication light is detected.

19. A non-transitory, computer-readable, storage medium storing computer-readable instructions that, when executed by one or more processors, cause a handheld scanner to:

capture image data representing a target in a field of view of the handheld scanner that passes through a front-facing opening on a front side of the handheld scanner, wherein the front-facing opening is configured to face away from a user when the user has the handheld scanner in a handheld position;

decode an indicia captured in the image data;

generate light with a light source disposed inside the handheld scanner;

provide an indication to the user by emitting the light through an indicator window of the handheld scanner, wherein the indicator window is positioned to face at least one of rearwardly, upwardly, or sidewardly relative to the front-facing opening and toward the user to be generally visible to the user when the user has the handheld scanner in the handheld position;

detect a reflection of the emitted light with a light detector disposed inside the handheld scanner, wherein the reflection of the emitted light occurs when an object is positioned in front of or on the indicator window outside the handheld scanner; and control a mode of the handheld scanner and/or a device in communication with the handheld scanner in response to detecting the reflection of the emitted light.

20. The storage medium of claim 19, wherein the instructions, when executed by the one or more processors, causes the handheld scanner to:

detect an amount of ambient light when the indication light is not being emitted; and control the mode in response to detecting a change in the amount of ambient light.

21. The storage medium of claim 19, wherein the instructions, when executed by the one or more processors, causes the handheld scanner to control the mode when an amount of reflected indication light satisfies a criteria.

22. The storage medium of claim 19, wherein the instructions, when executed by the one or more processors, causes the handheld scanner to control the light source to provide the indication light as a steady light to indicate a powered on status and to provide the indication light in a blinking manner to indicate a successful indicia decode.

23. The storage medium of claim 19, wherein the instructions, when executed by the one or more processors, causes the handheld scanner to control the mode by at least one of (1) control the mode while the reflection of the emitted indication light is detected, (2) control the mode by switching the mode through a plurality of modes each time the reflection of the emitted indication light is detected, or (3) control the mode by toggling the mode between two modes each time the reflection of the emitted indication light is detected.

* * * * *